E. G. SCHLEGEL.
CAMERA MATTING FRAME.
APPLICATION FILED AUG. 3, 1920.

1,368,761.

Patented Feb. 15, 1921.
2 SHEETS—SHEET 1.

Inventor
Erich G. Schlegel
By Frederick V. Winters
Attorney.

E. G. SCHLEGEL.
CAMERA MATTING FRAME.
APPLICATION FILED AUG. 3, 1920.

1,368,761.

Patented Feb. 15, 1921.
2 SHEETS—SHEET 2.

Inventor:
Erich G. Schlegel,
By Frederick V. Winter
Attorney.

UNITED STATES PATENT OFFICE.

ERICH G. SCHLEGEL, OF NEW YORK, N. Y.

CAMERA MATTING-FRAME.

1,368,761.

Specification of Letters Patent.   Patented Feb. 15, 1921.

Application filed August 3, 1920.   Serial No. 401,014.

*To all whom it may concern:*

Be it known that I, ERICH G. SCHLEGEL, a citizen of Germany, residing at New York, in the county and State of New York, have invented certain new and useful Improvements in Camera Matting-Frames, of which the following is a full, clear, and exact specification.

This invention relates to camera attachments for adjusting field reducing mats such as are used especially on moving picture cameras for cutting down the exposures to fractions of the entire surface of the films, as when two or more pictures are to be taken on the same films.

It is the object of this invention to provide simple and improved means for holding said mats securely in any desired adjustment, and permitting them to be removed or adjusted in different positions with ease and accuracy. Another object is to provide means whereby said mats may be quickly adjusted to cover any desired portion of the film or exposure surface, without the necessity of measuring or relying upon the eye for determining the exact part or fraction of said surface to be covered or exposed. Other objects will appear as the description proceeds.

The invention will be first hereinafter described in connection with the accompanying drawings, which constitute part of this specification, and then more specifically defined in the claims at the end of the description.

In the accompanying drawings, wherein similar reference characters are used to designate corresponding parts throughout the several views:—

Figure 1:
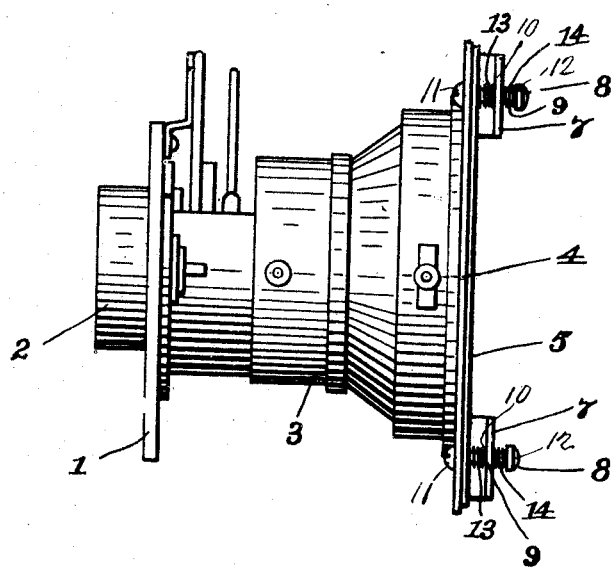
Figure 1 is a side elevation of the mat holder attached to the lens board of a camera.
Figure 2:
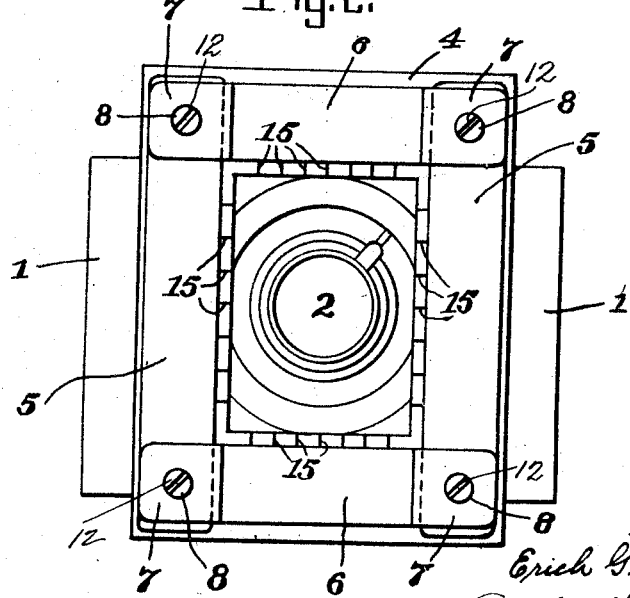
Fig. 2 is an elevation of the mat holder looking at it from the right hand side of Fig. 1.
Figure 3:
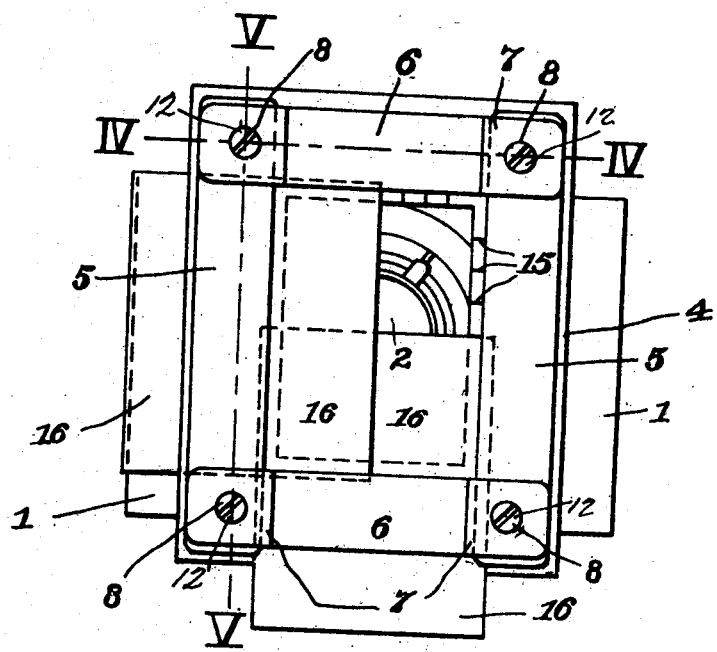
Fig. 3 is a similar view to that shown in Fig. 2 but showing one adjustment of the mats for exposing one-quarter of the field of the film.
Figure 4:
Fig. 4 is a section on the line IV—IV of Fig. 3.
Figure 5:
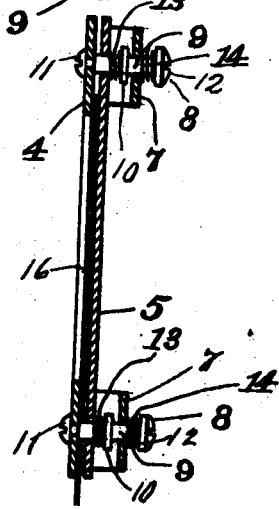
Fig. 5 is a section on the line V—V of the same figure.

In Figs. 1, 2 and 3, 1 designates the lens board of a camera, 2 the lens, 4 the frame for holding the reducing mats, and 3 the tubular connection between said board and frame. The mats 16, of which two are shown in Figs. 3, 4 and 5, are adjustably held in frictional contact with the rear face of the frame 4 by means of two vertical strips 5 and two horizontal strips 6 extending along the margins of the frame. The strips 6 have outwardly offset end portions 7 which overlap and are spaced from the end portions of the strips 5.

Figure 6:
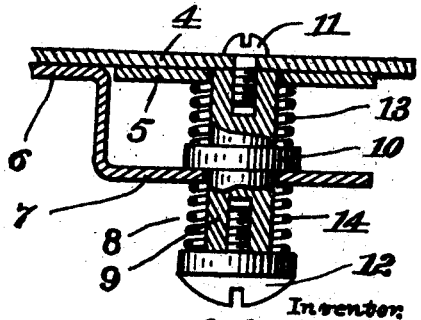
Fig. 6 is an enlarged section through one of the studs for holding the mat retaining strips in place.

The overlapping end portions of the strips 5 and 6 are yieldingly pressed against the corners of the frame by spring carrying studs 8. Each of said studs comprises a shank 9, as best shown in Fig. 6, said shank having an intermediate collar 10 preferably integral therewith and arranged about midway of its length. One end of each stud is secured to a corner of the frame 4 by a screw 11 or other suitable means. The end portion of the strip 5 fits loosely over said inner end of the shank of the stud and is pressed into contact with or toward said frame by a coiled spring 13 interposed between said spring and the collar 10. The offset portion 7 of the strip 6 fits loosely over the outer end portion of the stud and is pressed toward the frame 4 by means of another coiled spring 14 interposed between said offset portion of the strip and a cap screw 12 at the outer end of said stud. By this arrangement, each of the mat holding strips has free and independent movement and will hold any number of mats of any desired thickness with equal security.

As shown in Figs. 3, 4 and 5, the mats 16 may be placed so as to overlap at certain points and extend in single thicknesses at other points between said strips and the frame 4. By reason of the separate resilient holding means shown and described for said strips, and inasmuch as said strips are made thin enough to spring slightly if necessary to compensate for the difference in thicknesses of the mats placed between them and the frame 4, said mats will be held securely and evenly in the position shown as well as in any other position in which they may be placed.

To facilitate the accurate adjustment of the mats to cover or expose any desired portion or fraction of the entire field of exposure of the camera, the inner marginal portion of the frame is marked off or graduated as indicated at 15 in Figs. 2 and 3. By means of these graduated markings the mats may be placed very quickly to expose any part of the film (not shown), without making it necessary to measure off with a rule or simply guess at the wanted position.

Having thus described my invention, what I claim as new and desire to secure by Letters Patent of the United States is:—

1. In a camera, the combination with a field outlining frame, of strips around the frame, and means for yieldingly pressing said strips toward said frame for holding mats for reducing the field to be exposed.

2. In a camera, the combination with a field outlining frame, of strips mounted upon said frame, and means for independently pressing each of said strips yieldingly against said frame for holding field reducing mats.

3. In a camera, the combination with a field outlining frame, of strips extending along the sides and ends of said frame, the ends of certain of said strips being offset to overlap the others and the main portions of all of said strips being in the same plane, and means for independently pressing each of said strips yieldingly toward the frame for holding field reducing mats.

4. In a camera, the combination with a field outlining frame, of strips extending along the sides and ends of said frame, the ends of certain of said strips being offset to overlap the others and being spaced from said overlapped parts, permitting independent movement of all of the strips, and means for yieldingly pressing each strip separately toward the frame for holding field reducing mats in verious positions.

5. In a camera, the combination with a field outlining frame, of strips extending along the sides and ends of said frame, the ends of certain of said strips being offset to overlap the others and being spaced from said overlapped parts to permit independent movement of all of the strips, studs passed loosely through the overlapped end portions of the strips, and separate springs on each of said studs to press each strip separately toward said frame for the purpose specified.

6. In a camera, the combination with a field outlining frame, of strips extending along the sides and ends of said frame, the ends of certain of said strips being offset to overlap the others and being spaced from said overlapped parts to permit independent movement of all of the strips, studs secured to the corners of the frame and passed loosely through the overlapping end portions of the strips, separate springs on each stud to press each strip separately toward said frame for the purpose specified, and collars on said studs intermediate of their ends forming abutments for the inner springs thereon, there being abutments on the outer ends of the studs for holding the outer springs.

7. In a camera, the combination with a field outlining frame, of means for adjustably holding field reducing mats in different positions over said frame for the purpose specified, and graduations on said frame for determining the positions of said mats.

In testimony whereof I have signed my name to this specification.

ERICH SCHLEGEL.